US012293608B2

(12) United States Patent
Wang et al.

(10) Patent No.: US 12,293,608 B2
(45) Date of Patent: May 6, 2025

(54) METHOD FOR GENERATING AN ELECTRONIC SIGNATURE FOR AN ELECTRONIC DOCUMENT

(71) Applicants: William Wang, New Taipei (TW); Yu-Sung Su, New Taipei (TW)

(72) Inventors: William Wang, New Taipei (TW); Yu-Sung Su, New Taipei (TW)

(*) Notice: Subject to any disclaimer, the term of this patent is extended or adjusted under 35 U.S.C. 154(b) by 347 days.

(21) Appl. No.: 18/095,038

(22) Filed: Jan. 10, 2023

(65) Prior Publication Data
US 2023/0237851 A1 Jul. 27, 2023

(30) Foreign Application Priority Data
Jan. 25, 2022 (TW) ................................. 111103116

(51) Int. Cl.
*G06V 40/70* (2022.01)
*G06V 30/32* (2022.01)
*G06V 40/12* (2022.01)

(52) U.S. Cl.
CPC ............ *G06V 40/70* (2022.01); *G06V 30/347* (2022.01); *G06V 40/1365* (2022.01)

(58) Field of Classification Search
CPC .. G06V 40/70; G06V 30/347; G06V 40/1365; G06V 40/394; G06F 21/64; G06F 21/16; G06F 21/32
See application file for complete search history.

(56) References Cited

U.S. PATENT DOCUMENTS

| | | | | |
|---|---|---|---|---|
| 11,615,172 B1* | 3/2023 | Huggar | ................. | G06F 3/0488 726/18 |
| 2016/0078277 A1* | 3/2016 | Sprigg | .................... | G06F 21/32 382/119 |
| 2020/0310562 A1* | 10/2020 | Zipp | ....................... | G10L 15/22 |

* cited by examiner

*Primary Examiner* — Wassim Mahrouka
(74) *Attorney, Agent, or Firm* — MUNCY, GEISSLER, OLDS & LOWE, P.C.

(57) ABSTRACT

A method for generating an electronic signature for an electronic document is implemented by an electronic device that is in communication with a stylus pen and a handwriting input device that includes a writing area. The method includes: initiating a signature input procedure associated with the electronic document; obtaining a signature pattern and an experienced pressure dataset recorded by the handwriting input device during the signature input procedure, and obtaining a fingerprint dataset and an applied pressure dataset recorded by the stylus pen during the signature input procedure; determining whether the experienced pressure dataset corresponds with the applied pressure dataset; and in the case where the experienced pressure dataset corresponds with the applied pressure dataset, generating a signed electronic document by presenting the signature pattern on a part of the electronic document and embedding the fingerprint dataset in the signature pattern.

9 Claims, 9 Drawing Sheets

METHOD FOR GENERATING AN ELECTRONIC SIGNATURE FOR AN ELECTRONIC DOCUMENT

CROSS-REFERENCE TO RELATED APPLICATION

This application claims priority to Taiwanese Invention Patent Application No. 111103116, filed on Jan. 25, 2022.

FIELD

The disclosure relates to a method for generating an electronic signature, particularly to a method for generating an electronic signature for an electronic document.

BACKGROUND

As a result of developments of electronic technologies, in many occasions, documents are in the form of electronic documents, and hardcopies thereof are no longer required. In the cases where the electronic documents need to be signed, a number of ways are provided for generating electronic signatures for the electronic documents. One issue in the field of electronic signatures is authentication, that is, to determine whether an electronic signature is actually signed by the presumed signee, or whether an electronic signature is actually produced using image processing software, etc.

SUMMARY

Therefore, an object of the disclosure is to provide a method for generating an electronic signature for an electronic document that provides a more secure way for authenticating the electronic signature.

According to the one embodiment of the disclosure, the method for generating an electronic signature for an electronic document is implemented by an electronic device that is in communication with a stylus pen and a handwriting input device that includes a writing area. The method includes:
- initiating a signature input procedure associated with the electronic document;
- obtaining a signature pattern and an experienced pressure dataset recorded by the handwriting input device during the signature input procedure, and obtaining a fingerprint dataset and an applied pressure dataset recorded by the stylus pen during the signature input procedure;
- determining whether the experienced pressure dataset corresponds with the applied pressure dataset; and
- in the case where the experienced pressure dataset corresponds with the applied pressure dataset, generating a signed electronic document by presenting the signature pattern on a part of the electronic document and embedding the fingerprint dataset in the signature pattern.

According to the one embodiment of the disclosure, the method for generating an electronic signature for an electronic document is implemented by an electronic device, a handwriting input device that includes a writing area, and a stylus pen. The method includes:
- initiating, by the electronic device, a signature input procedure associated with the electronic document;
- obtaining, by the handwriting input device, a signature pattern and an experienced pressure dataset during the signature input procedure;
- obtaining, by the stylus pen, a fingerprint dataset and an applied pressure dataset during the signature input procedure;
- collecting, by one of the handwriting input device and the stylus pen, the signature pattern and the experienced pressure dataset or the fingerprint dataset and the applied pressure dataset from the other one of the handwriting input device and the stylus pen;
- determining, by the one of the handwriting input device and the stylus pen, whether the experienced pressure dataset corresponds with the applied pressure dataset;
- in the case where the experienced pressure dataset corresponds with the applied pressure dataset, transmitting, by the one of the handwriting input device and the stylus pen, the signature pattern and the fingerprint dataset to the electronic device; and
- generating, by the electronic device, a signed electronic document by presenting the signature pattern on a part of the electronic document and embedding the fingerprint dataset in the signature pattern.

According to the one embodiment of the disclosure, the method for generating an electronic signature for an electronic document is implemented by an electronic device, a handwriting input device that includes a writing area, and a stylus pen. The method includes:
- initiating, by the electronic device, a signature input procedure associated with the electronic document;
- obtaining, by the handwriting input device, a signature pattern and an experienced pressure dataset during the signature input procedure;
- obtaining, by the stylus pen, a fingerprint dataset and an applied pressure dataset during the signature input procedure;
- collecting, by one of the handwriting input device and the stylus pen, the experienced pressure dataset or the applied pressure dataset from the other one of the handwriting input device and the stylus pen;
- determining, by the one of the handwriting input device and the stylus pen, whether the experienced pressure dataset corresponds with the applied pressure dataset;
- in the case where the experienced pressure dataset corresponds with the applied pressure dataset, transmitting, by the one of the handwriting input device and the stylus pen, a corresponding one of the signature pattern and the fingerprint dataset to the electronic device, and transmitting a signal to the other one of the handwriting input device and the stylus pen;
- in response to the receipt of the signal, transmitting, by the other one of the handwriting input device and the stylus pen, the other one of the signature pattern and the fingerprint dataset to the electronic device; and
- generating, by the electronic device, a signed electronic document by presenting the signature pattern on a part of the electronic document and embedding the fingerprint dataset in the signature pattern.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Before the disclosure is described in greater detail, it should be noted that where considered appropriate, reference numerals or terminal portions of reference numerals have been repeated among the figures to indicate corresponding or analogous elements, which may optionally have similar characteristics.

Throughout the disclosure, the term "coupled to" or "connected to" may refer to a direct connection among a plurality of electrical apparatus/devices/equipment via an electrically conductive material (e.g., an electrical wire), or an indirect connection between two electrical apparatus/devices/equipment via another one or more apparatus/devices/equipment, or wireless communication.

Figure 1:
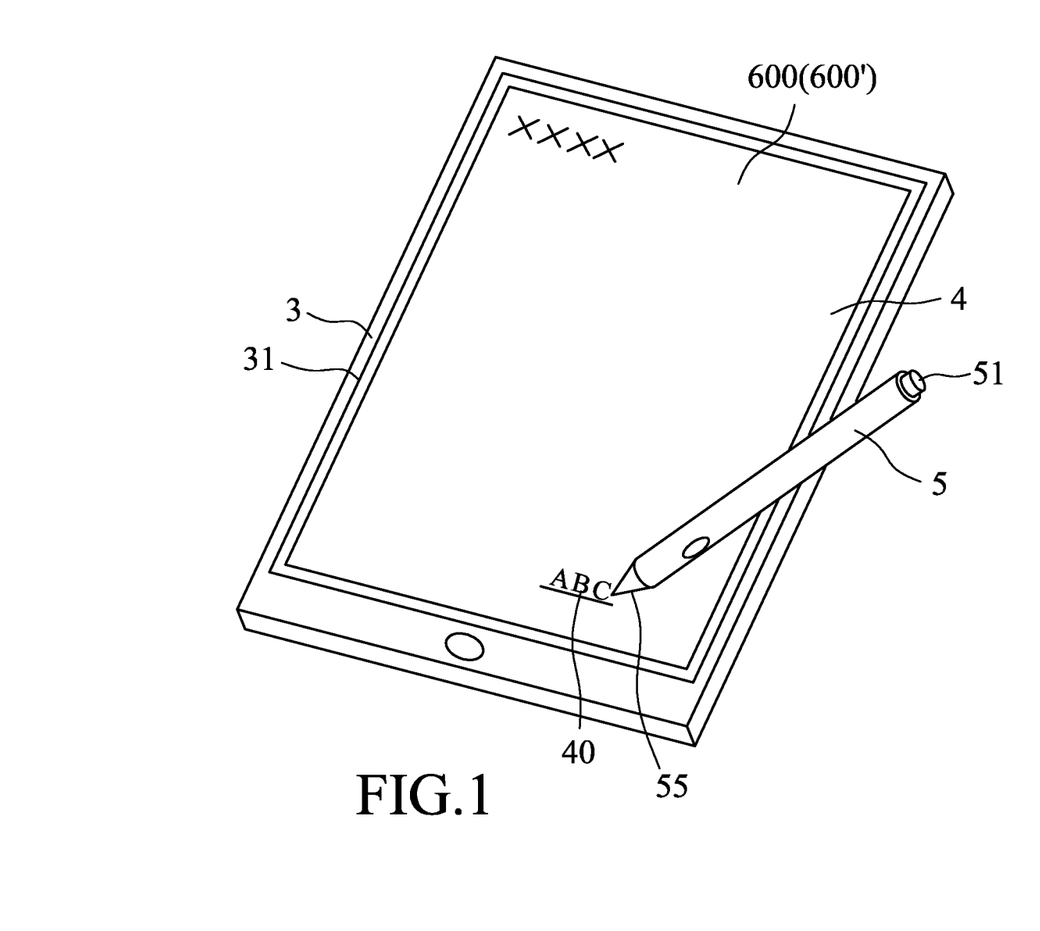
FIG. 1 illustrates an electronic device that is configured to display an electronic document thereon, a handwriting input device that is integrated in the electronic device, and a stylus pen according to one embodiment of the disclosure.
Figure 6:
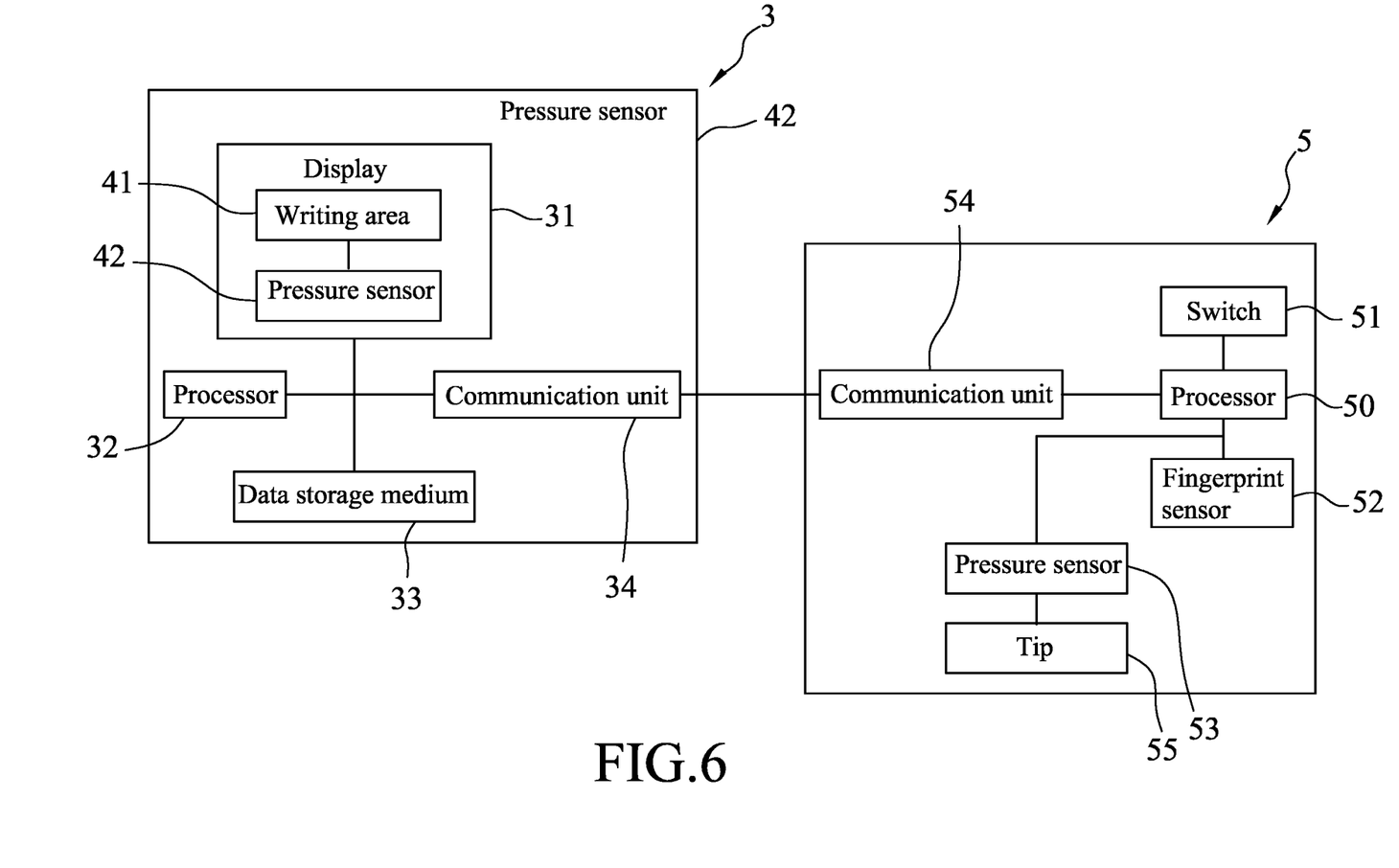
FIG. 6 is a block diagram illustrating components of the electronic device, the handwriting input device and the stylus pen illustrated in the embodiment of FIG. 1.

FIG. 1 illustrates an electronic device 3 configured to display an electronic document 600 thereon, a handwriting input device 4 integrated in the electronic device 3, and a stylus pen 5 according to one embodiment of the disclosure. The electronic device 3 is configured to interact with the handwriting input device 4 and the stylus pen 5. FIG. 6 is a block diagram illustrating components of the electronic device 3, the handwriting input device 4 and the stylus pen 5 illustrated in the embodiment of FIG. 1.

In this embodiment, the electronic device 3 is embodied using a tablet computer, but the electronic device 3 may be embodied using other electronic devices such as a personal computer, a laptop, a smartphone, etc., in other embodiments. The electronic device 3 includes a display 31, a processor 32, a data storage medium 33, and a communication unit 34.

The processor 32 may include, but not limited to, a single core processor, a multi-core processor, a dual-core mobile processor, a microprocessor, a microcontroller, a digital signal processor (DSP), a field-programmable gate array (FPGA), an application specific integrated circuit (ASIC), and/or a radio-frequency integrated circuit (RFIC), etc.

The data storage medium 33 may be embodied using, for example, random access memory (RAM), read only memory (ROM), programmable ROM (PROM), firmware, and/or flash memory, etc. The data storage medium 33 stores a software application therein. The software application includes instructions that, when executed by the processor 32, cause the processor 32 to perform the operations as described below.

The communication unit 34 may include one or more of a radio-frequency integrated circuit (RFIC), a short-range wireless communication module supporting a short-range wireless communication network using a wireless technology of Bluetooth® and/or etc., and a mobile communication module supporting telecommunication using Long-Term Evolution (LTE), the third generation (3G), the fourth generation (4G) or fifth generation (5G) of wireless mobile telecommunications technology, or the like.

The display 31 is embodied using a touch screen in this embodiment, but may be a conventional (without touch function) display screen in other embodiments.

The handwriting input device 4 includes a writing area 41 and a pressure sensor 42. It is noted that in the embodiment of FIG. 1, the writing area 41 is embodied using the touch screen. The pressure sensor 42 may be disposed under the writing area 41, and is configured to, when the writing area 41 is pressed by an object (e.g., the stylus pen 5), continuously detect a contact point on the writing area 41 and a corresponding experienced pressure.

Figure 3:
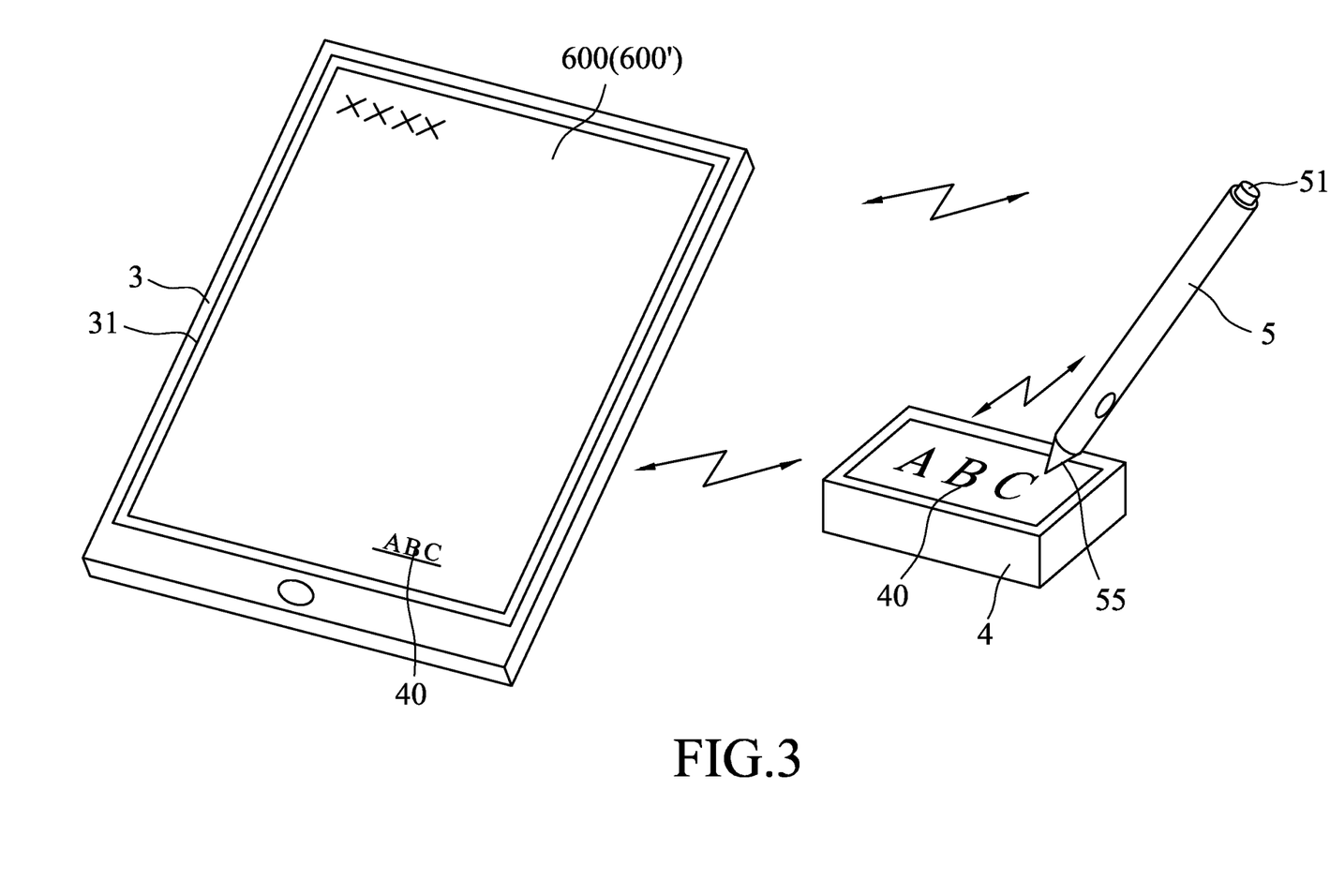
FIG. 3 illustrates an electronic device that is configured to display an electronic document thereon, a handwriting input device that is separate from the electronic device, and a stylus pen according to one embodiment of the disclosure.
Figure 7:
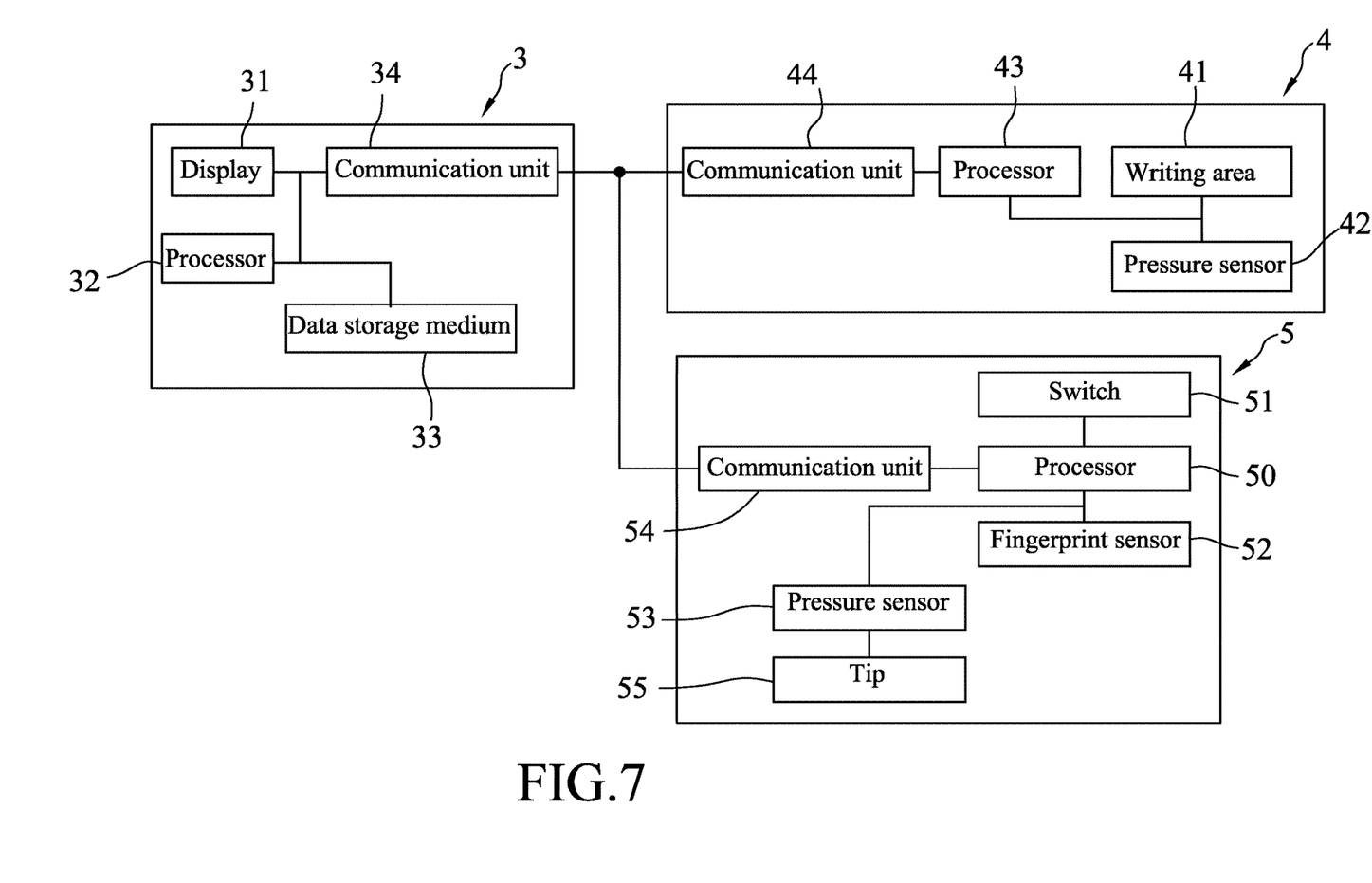
FIG. 7 is a block diagram illustrating components of the electronic device, the handwriting input device and the stylus pen illustrated in the embodiment of FIG. 3.

In other embodiments, the handwriting input device 4 may be a graphic tablet, an embedded liquid crystal display (LCD) tablet or other input devices that are separate from the electronic device 3. For example, FIG. 3 illustrates an electronic device 3 configured to display an electronic document 600 thereon, a handwriting input device 4 separate from the electronic device 3, and a stylus pen 5 according to one embodiment of the disclosure. FIG. 7 is a block diagram illustrating components of the electronic device 3, the handwriting input device 4 and the stylus pen 5 illustrated in the embodiment of FIG. 3. In such case, the handwriting input device 4 may further include a processor 43 that includes components similar to those of the processor 32 (e.g., a microprocessor) for performing the operations as described below, and a communication unit 44 that includes components similar to those of the communication unit 34. The handwriting input device 4 may be connected to the electronic device 3 via a wired or wireless connection.

Referring back to FIG. 6, in this embodiment, the stylus pen 5 includes a processor 50, a switch 51, a fingerprint sensor 52, a pressure sensor 53, a communication unit 54, and a tip 55. The processor 50 may include components similar to those of the processor 32 (e.g., a microprocessor) for performing the operations as described below. The fingerprint sensor 52 is configured to, when the stylus pen 5 is held by a user such that a finger (e.g., the thumb) of the user is in contact with the fingerprint sensor 52, detect a fingerprint on the fingerprint sensor 52, so as to generate a fingerprint dataset. The pressure sensor 53 may be disposed in the tip 55, and is configured to, when the tip 55 is pressed against another object (e.g., the handwriting input device 4), continuously detect an applied pressure. The communication unit 54 may include components similar to those of the communication unit 34. In some embodiments, wireless communication among the electronic device 3, the handwriting input device 4 and the stylus pen 5 is realized via the communication unit 34, the communication unit 44 (see FIG. 7) and the communication unit 54.

In this embodiment, the electronic document 600 may be in the form of a portable document format (PDF), an e-mail, or other document formats.

Figure 2:
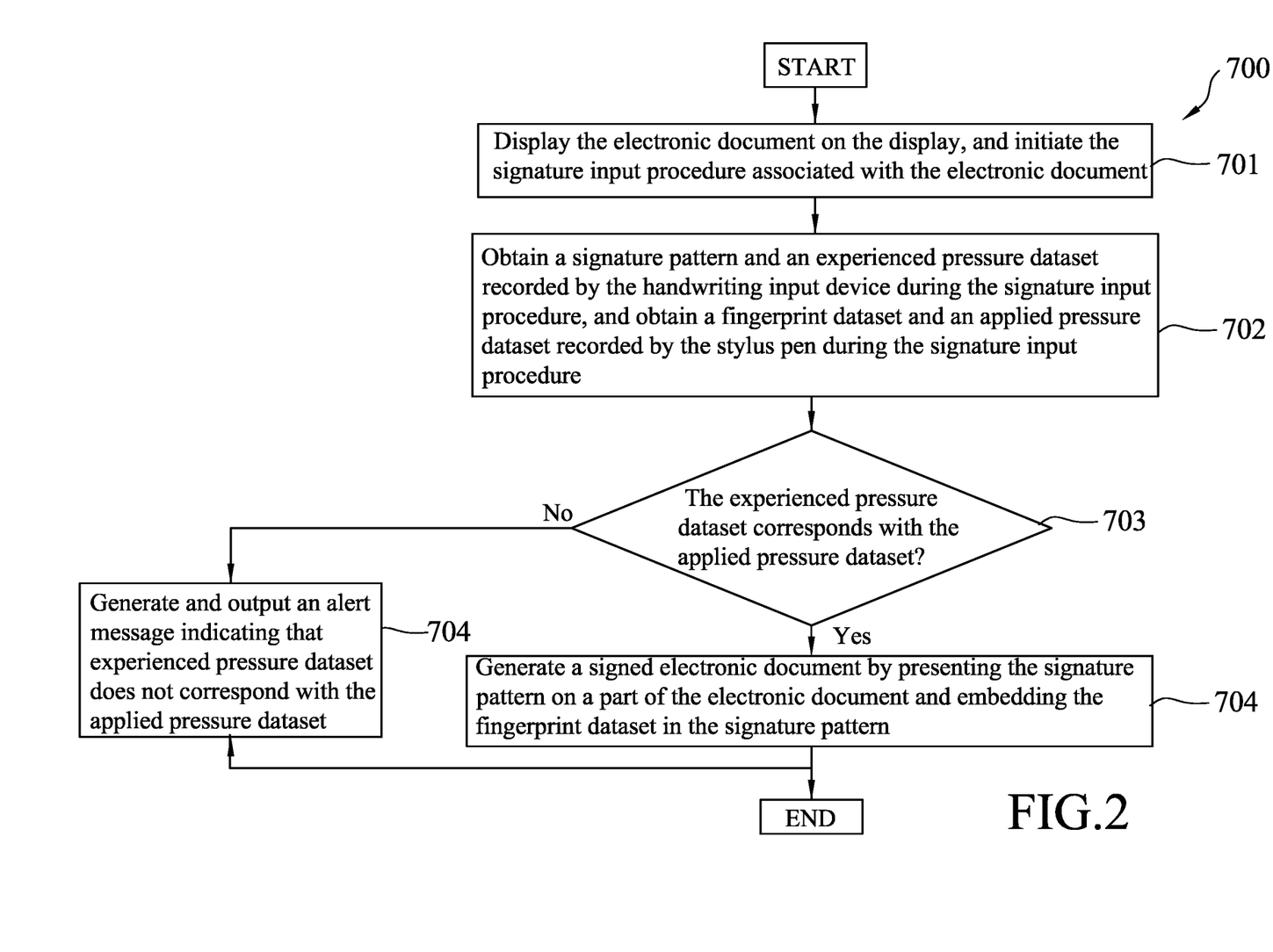
FIG. 2 is a flow chart illustrating steps of a method for generating an electronic signature for an electronic document according to one embodiment of the disclosure.

FIG. 2 is a flow chart illustrating steps of a method 700 for generating an electronic signature for an electronic document 600 according to one embodiment of the disclosure. In this embodiment, the method is implemented using the electronic device 3 (with the handwriting input device 4 integrated therein) and the stylus pen 5 as shown in FIG. 1.

In use, when it is intended to generate an electronic signature associated with a user for the electronic document 600, the user or another person may operate the electronic device 3 to open the electronic document 600 such that the electronic document 600 is displayed on the display 31, and operate the electronic device 3 to execute the software application so as to initiate a signature input procedure. In step 701, the electronic device 3 displays the electronic document 600 on the display 31, and initiates the signature input procedure associated with the electronic document 600. In some embodiments, the signature input procedure may be automatically initiated by the processor 32 after the electronic document 600 is displayed on the display 31. In some embodiments, after the electronic document 600 is displayed on the display 31, the signature input procedure may be initiated by pressing the switch 51.

In response to the initiation of the signature input procedure, the handwriting input device 4 and the stylus pen 5 are activated by the electronic device 3, and the user holding the stylus pen 5 starts signing on the writing area 41 of the handwriting input device 4 during the signature input procedure.

In step 702, the electronic device 3 obtains a signature pattern 40 and an experienced pressure dataset recorded by the handwriting input device 4 during the signature input procedure, and obtains a fingerprint dataset and an applied pressure dataset recorded by the stylus pen 5 during the signature input procedure.

Specifically, as the user holding the stylus pen 5 signs, the handwriting input device 4 continuously detects a plurality of contact points on the writing area 41 and a plurality of corresponding experienced pressures. As a result, after the user finishes signing, the contact points thus detected form the signature pattern 40, and the contact points thus detected and the experienced pressures thus detected cooperatively form the experienced pressure dataset. That is to say, the experienced pressure dataset includes a sequence of successive contact points on the writing area 41 and a sequence of experienced pressures that are sensed by the handwriting input device 4 and that are associated with the contact points, respectively.

Simultaneously, the stylus pen 5 continuously detects a plurality of applied pressures, and after the user finishes signing, the applied pressures thus detected form the applied pressure dataset. That is to say, the applied pressure dataset includes a sequence of applied pressures sensed by the pressure sensor 53 disposed in the tip 55 of the stylus pen 5. Additionally, the fingerprint sensor 52 generates a fingerprint dataset that contains a fingerprint related to the user.

It is noted that in some embodiments, each of the handwriting input device 4 and the stylus pen 5 includes a timing component that keeps track of a current time, and in recording the experienced pressure dataset and the applied pressure dataset, a plurality of time instances associated with the signature are incorporated into each of the experienced pressure dataset and the applied pressure dataset. It is noted that the timing components included in the handwriting input device 4 and the stylus pen 5 may be automatically or manually synchronized before signing is performed. Specifically, the plurality of time instances include a starting time instance at which the experienced pressure and the applied pressure are first detected, representing that the user has started signing, and an ending time instance at which the experienced pressure and the applied pressure are no longer detected (i.e., the detected value going from a positive value to zero) and remain undetected for a pre-determined time period (e.g., 2 to 3 seconds), representing that the user has finished signing and moved the stylus pen 5 away from the handwriting input device 4. Additionally, during the signing, a number of breaks, in which the user completes a stroke of the signature pattern 40, then moves the stylus pen 5 away from the handwriting input device 4 briefly, and then moves the stylus pen 5 toward the handwriting input device 4 to begin a next stroke, may occur; meanwhile, the experienced pressure and the applied pressure would briefly drop to zero before going up again. A time instance the experienced pressure (or the applied pressure) drops to zero and a time instance the experienced pressure (or the applied pressure) goes up are also recorded and included in the experienced pressure dataset (or the applied pressure dataset).

It is noted that for different people, the signature of the user may include one or more strokes. Using the experienced pressure dataset and the applied pressure dataset, each of the strokes may be defined as an event that starts at a contacting time instance when the experienced pressure and the applied pressure are first detected and ends at a parting time instance when the experienced pressure and the applied pressure are not detected.

Additionally, using the sequence of experienced pressures included in the experienced pressure dataset, a characteristic of the experienced pressures (e.g., a trend of the experienced pressures over time, a plot of the experienced pressures with respect to the time instances, a shape of the plot, etc.) may be obtained based on data included in the experienced pressure dataset with respect to the signature pattern 40, or with respect to individual strokes of the signature pattern 40, based on the data recorded and included in the experienced pressure dataset. Similarly, a characteristic of the applied pressures may be obtained based on data included in the applied pressure dataset with respect to the signature pattern 40, or with respect to individual strokes of the signature pattern 40. It is noted that the operations associated with obtaining a trend over time and plotting data are well known in the related art, and the details thereof are omitted herein for the sake of brevity, After the user has finished signing, he/she may press the switch 51 to signify that the signing is complete, and in response, the stylus pen 5 may transmit a signal to the electronic device 3 and the handwriting input device 4 to indicate that the signature input procedure is terminated. In some embodiments, after the stylus pen 5 ceases to contact the handwriting input device 4 (as can be indicated by the experienced pressures and/or the applied pressures thus detected) for the pre-determined time period (e.g., 2 to 3 seconds), the signature input procedure is automatically terminated. In some embodiments, after the stylus pen 5 has not detected the fingerprint for a release time period (e.g., 0.5 to 1 second), the signature input procedure is automatically terminated. Afterward, the handwriting input device 4 proceeds to transmit the signature pattern 40 and the experienced pressure dataset to the electronic device 3, and the stylus pen 5 proceeds to transmit the applied pressure dataset and the fingerprint dataset to the electronic device 3.

In step 703, the electronic device 3 determines whether the experienced pressure dataset corresponds with the applied pressure dataset.

Specifically, to determine whether the experienced pressure dataset corresponds with the applied pressure dataset, the electronic device 3 compares the characteristic of the experienced pressures with the characteristic of the applied pressures. In comparing the characteristic of the experienced pressures with the characteristic of the applied pressures, the trends of the experienced pressures and the applied pressures may be compared. In the case where the characteristic of the experienced pressures corresponds with the characteristic of the applied pressures, the electronic device 3 determines that the experienced pressure dataset corresponds with the applied pressure dataset.

In some embodiments, in order to determine whether the experienced pressure dataset corresponds with the applied pressure dataset, the electronic device 3 compares the starting time instances of the experienced pressure dataset and the applied pressure dataset, and compares the ending time instances of the experienced pressure dataset and the applied pressure dataset. The electronic device 3 determines that the experienced pressure dataset corresponds with the applied pressure dataset in the case where the starting time instance of the experienced pressure dataset is identical to the starting time instance of the applied pressure dataset, and the ending time instance of the experienced pressure dataset is identical to the ending time instance of the applied pressure dataset. In some embodiments, the characteristics, the starting time instances and the ending time instances of the experienced pressure dataset and the applied pressure dataset are all used for comparison in order to determine whether the experienced pressure dataset corresponds with the applied pressure dataset.

In some embodiments, the determination may be performed with respect to each of the strokes of the signature pattern 40. That is to say, for each of the strokes, two contacting time instances, from the experienced pressure dataset and the applied pressure dataset respectively, are compared, and two parting time instances, from the experienced pressure dataset and the applied pressure dataset respectively, are compared. When both pairs of corresponding contacting time instances are identical, the electronic device 3 determines that the experienced pressure dataset corresponds with the applied pressure dataset. In the case where the electronic device 3 determines that the experienced pressure dataset does not correspond with the applied pressure dataset, the flow proceeds to step 705, in which the electronic device 3 generates and outputs an alert message indicating that experienced pressure dataset does not correspond with the applied pressure dataset. This case may be a result of an error that occurred during transmission of the experienced pressure dataset or the applied pressure dataset, of the fact that the user did not use the stylus pen 5 to input the signature, or of the fact that the content of the experienced pressure dataset or the applied pressure dataset has been altered due to, for example, an external cyber-attack. In this case, the method is terminated and the electronic signature is not generated.

In the case where the experienced pressure dataset corresponds with the applied pressure dataset, the flow proceeds to step 704, in which the electronic device 3 generates a signed electronic document 600' by presenting the signature pattern 40 on a part of the electronic document 600 and embedding the fingerprint dataset in the signature pattern 40. In some embodiments, the fingerprint dataset may be encrypted, and in some cases, the fingerprint dataset may be embedded into the signed electronic document 600' in a hidden form (i.e., while the signature pattern 40 is visible, the fingerprint is not visible on the signed electronic document 600', but a special purpose software may be used to retrieve the fingerprint dataset). As such, the method for generating the signed electronic document including the electronic signature is completed.

In this manner, when it is intended to generate an electronic signature on an electronic document displayed on the electronic device 3, a user is to hold the stylus pen 5 to sign on the handwriting input device 4, which may be integrated with or connected to the electronic device 3. During the signature input procedure, the handwriting input device 4 is configured to record the contact points and the experienced pressure dataset, and the stylus pen 5 is configured to record the fingerprint dataset and the applied pressure dataset. The electronic device 3 is then configured to obtain the associated data from the handwriting input device 4 and the stylus pen 5, so as to compare the experienced pressure dataset and the applied pressure dataset. When it is determined that the experienced pressure dataset corresponds with the applied pressure dataset, the electronic device 3 proceeds to generate the signed electronic document by presenting the signature pattern on a part of the electronic document and embedding the fingerprint dataset in the signature pattern. As such, the resulting signed electronic document can be generated knowing that the signature pattern thereon is indeed signed by the user on the handwriting input device 4 and using the stylus pen 5, and the fingerprint dataset embedded in the signed electronic document can be used for subsequent authentication purposes. This increases the authenticity of the signed electronic document.

Figure 4A:
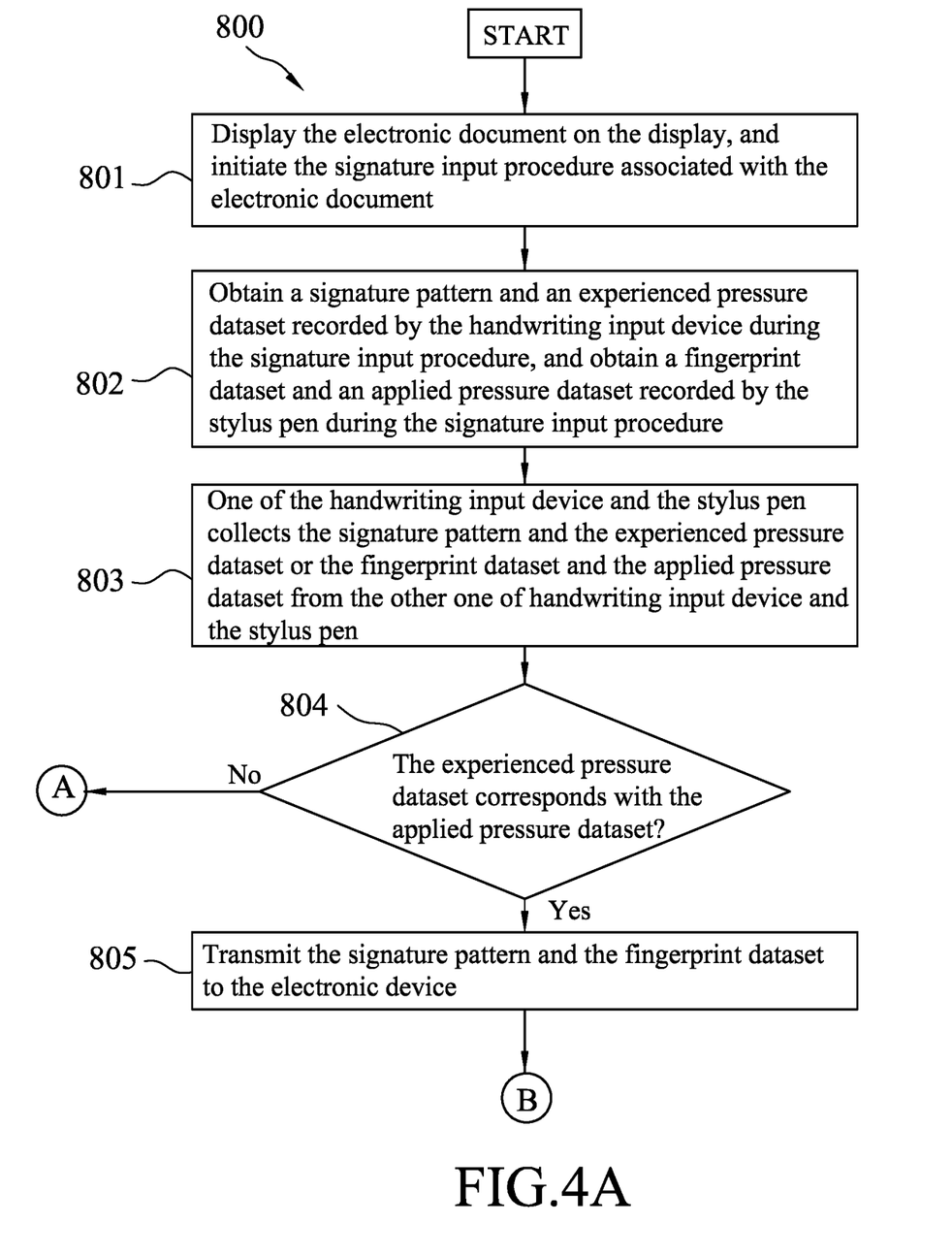
FIGS. 4A and 4B cooperatively constitute a flow chart illustrating steps of a method for generating an electronic signature for an electronic document according to one embodiment of the disclosure.
Figure 4B:
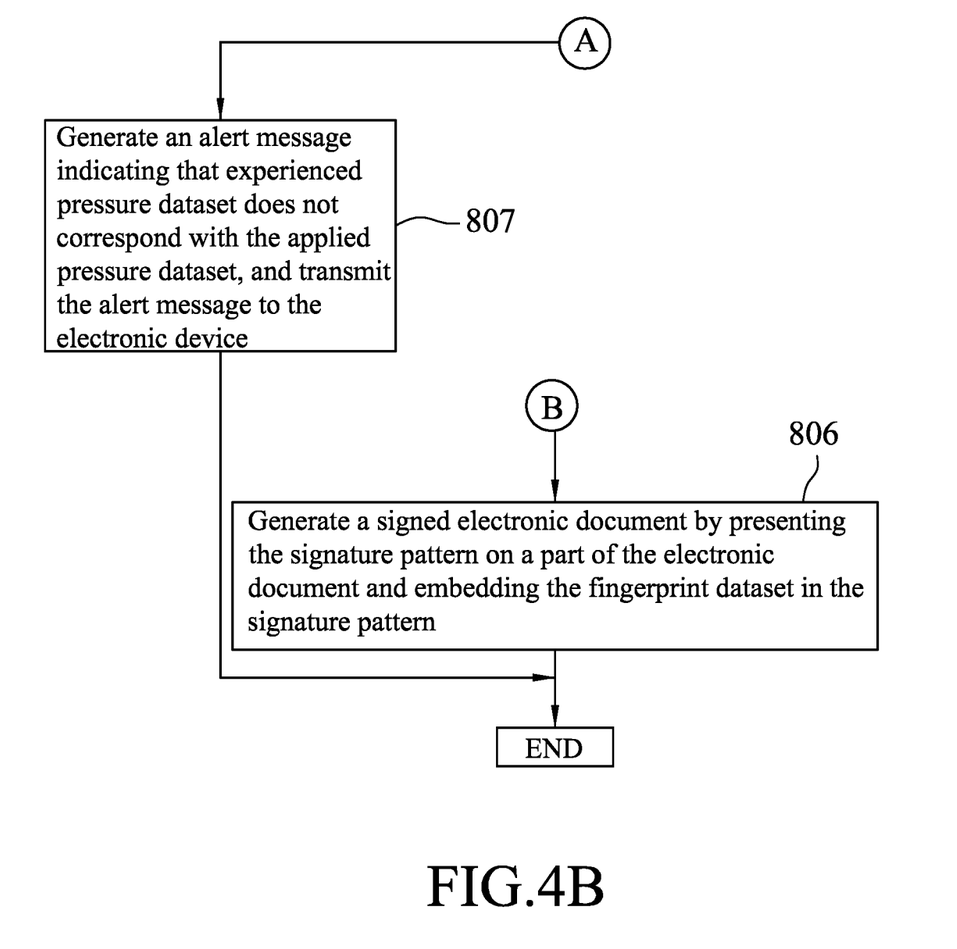

FIGS. 4A and 4B cooperatively constitute a flow chart illustrating steps of a method 800 for generating an electronic signature for an electronic document 600 according to one embodiment of the disclosure. In this embodiment, the method is implemented using the electronic device 3, the handwriting input device 4 that is separate from the electronic device 3, and the stylus pen 5 as shown in FIG. 3. It is noted that the details of steps 801 and 802 of the method 800 that are similar to steps 701 and 702 of the method 700 are omitted herein for the sake of brevity.

In the method 800, after the signature writing procedure is initiated in step 801, in step 802, the handwriting input device 4 obtains a signature pattern 40 and an experienced pressure dataset during the signature input procedure, and the stylus pen 5 obtains a fingerprint dataset and an applied pressure dataset during the signature input procedure.

Afterward, in step 803, one of the handwriting input device 4 and the stylus pen 5 collects the signature pattern 40 and the experienced pressure dataset or the fingerprint dataset and the applied pressure dataset from the other one of handwriting input device 4 and the stylus pen 5. In this embodiment, the handwriting input device 4 collects the fingerprint dataset and the applied pressure dataset from the stylus pen 5, but in other embodiments, the stylus pen 5 may collect the signature pattern 40 and the experienced pressure dataset from the handwriting input device 4.

Then, in step 804, the one of the handwriting input device 4 and the stylus pen 5 determines whether the experienced pressure dataset corresponds with the applied pressure dataset. In this embodiment, it is the handwriting input device 4 that performs the determination; however, the determination may also be performed by the stylus pen 5 in other embodiments. It is noted that details of the determination in this embodiment are similar to those as described in step 703, and are therefore omitted herein for the sake of brevity.

In the case where the experienced pressure dataset corresponds with the applied pressure dataset, the flow proceeds to step 805, in which the one of the handwriting input device 4 and the stylus pen 5 transmits the signature pattern 40 and the fingerprint dataset to the electronic device 3. In this embodiment, the handwriting input device 4 performs the transmission. Otherwise, the flow proceeds to step 807, in which the one of the handwriting input device 4 and the stylus pen 5 generates an alert message indicating that the experienced pressure dataset does not correspond with the applied pressure dataset, and transmits the alert message to the electronic device 3. This case may be a result of an error that occurred during transmission of the experienced pressure dataset or the applied pressure dataset, of the fact that the user did not use the stylus pen 5 to input the signature, or of the fact that the content of the experienced pressure dataset or the applied pressure dataset has been altered due to, for example, an external cyber-attack. In this case, the method is terminated and the electronic signature is not generated. It is noted that in this case, the signature pattern 40 and the fingerprint dataset are not transmitted to the electronic device 3.

Then, in step 806, in response to receipt of the signature pattern 40 and the fingerprint dataset, the electronic device 3 generates a signed electronic document 600' by presenting the signature pattern 40 on a part of the electronic document 600 and embedding the fingerprint dataset in the signature pattern 40.

It is noted that the method 800 also has effects and advantages similar to those of the method 700 described previously.

Figure 5A:
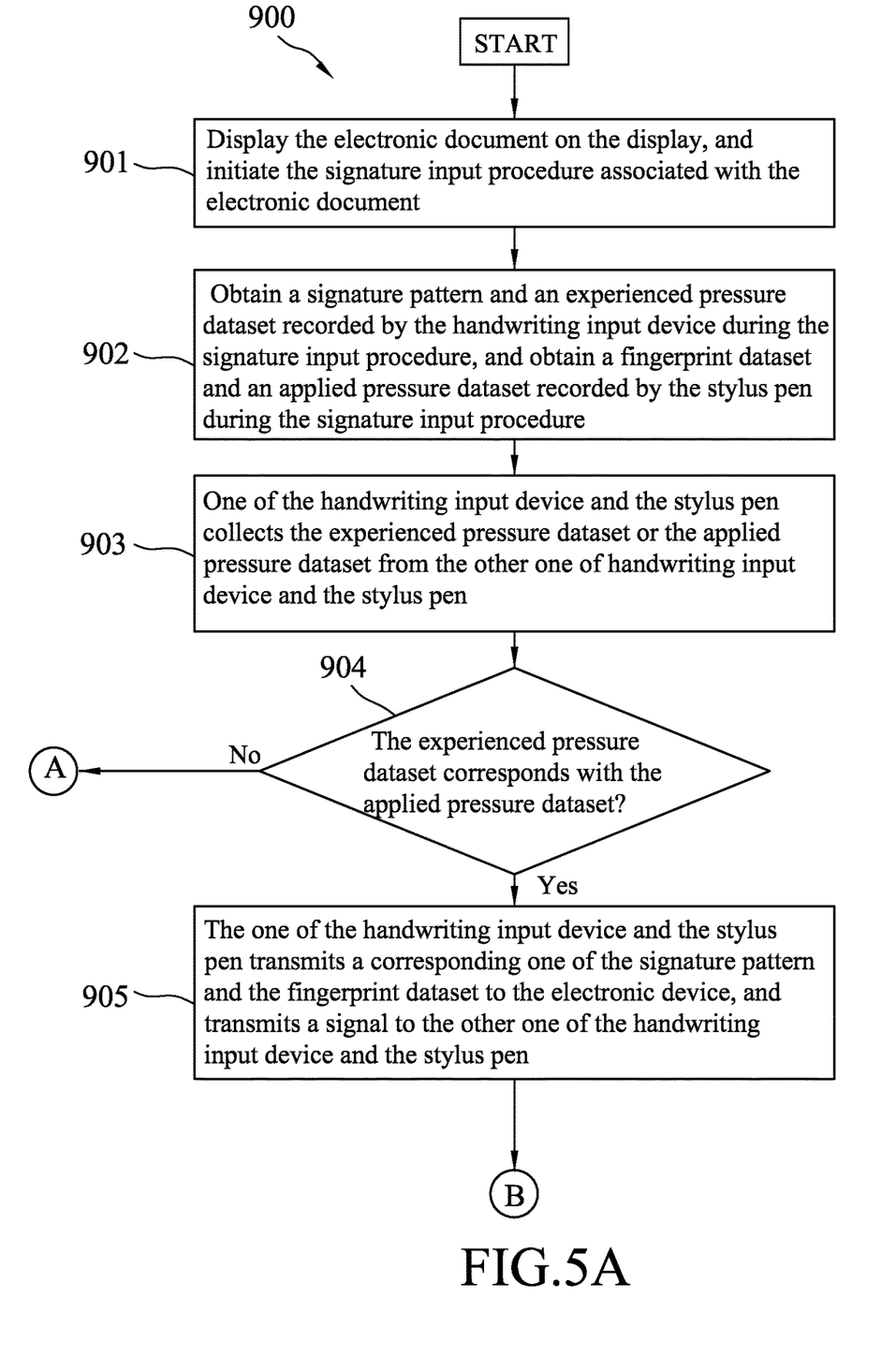
FIGS. 5A and 5B cooperatively constitute a flow chart illustrating steps of a method for generating an electronic signature for an electronic document according to one embodiment of the disclosure.
Figure 5B:
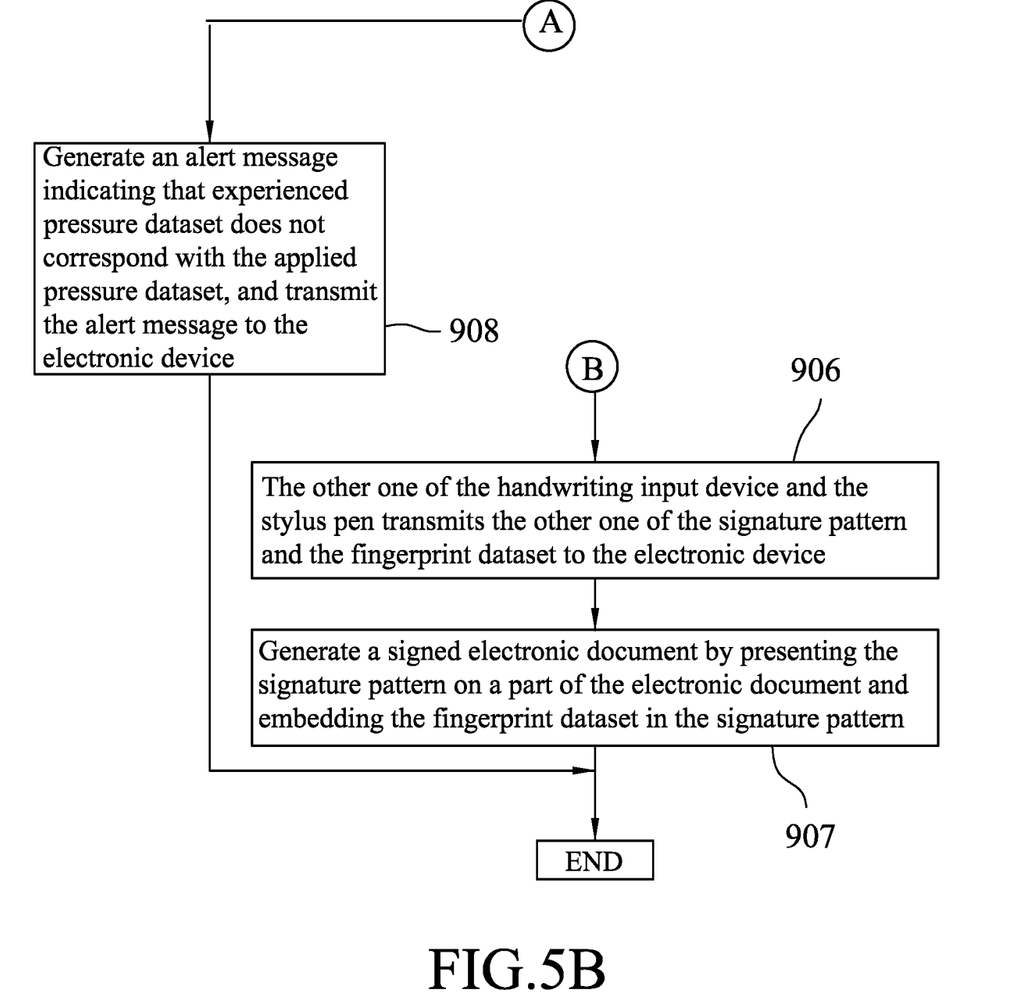

FIGS. 5A and 5B cooperatively constitute a flow chart illustrating steps of a method 900 for generating an electronic signature for an electronic document 600 according to one embodiment of the disclosure. In this embodiment, the method 900 is implemented using the electronic device 3, the handwriting input device 4 that is separate from the electronic device 3, and the stylus pen 5 as shown in FIG. 3. It is noted that the details of steps 901 and 902 of the method 900 that are similar to those of steps 701 and 702 of the method 700 are omitted herein for the sake of brevity.

In the method, after the signature input procedure is initiated in step 901, in step 902, the handwriting input device 4 obtains a signature pattern 40 and an experienced pressure dataset during the signature input procedure, and the stylus pen 5 obtains a fingerprint dataset and an applied pressure dataset during the signature input procedure.

Afterward, in step 903, one of the handwriting input device 4 and the stylus pen 5 collects the experienced pressure dataset or the applied pressure dataset from the other one of handwriting input device 4 and the stylus pen 5. In this embodiment, the handwriting input device 4 collects the applied pressure dataset from the stylus pen 5, but in other embodiments, the stylus pen 5 may collect the experienced pressure dataset from the handwriting input device 4.

Then, in step 904, the one of the handwriting input device 4 and the stylus pen 5 determines whether the experienced pressure dataset corresponds with the applied pressure dataset. In this embodiment, it is the handwriting input device 4 that performs the determination; however, the determination may be performed by the stylus pen 5 in other embodiments. It is noted that details of the determination in this embodiment are similar to those as described in step 703, and are therefore omitted herein for the sake of brevity.

In the case where the experienced pressure dataset corresponds with the applied pressure dataset, the flow proceeds to step 905, in which the one of the handwriting input device 4 and the stylus pen 5 transmits a corresponding one of the signature pattern 40 and the fingerprint dataset to the electronic device 3, and transmits a signal to the other one of the handwriting input device 4 and the stylus pen 5. In this embodiment, the handwriting input device 4 transmits the signature pattern 40, and transmits the signal to the stylus pen 5, but in other embodiments, the stylus pen 5 may transmit the fingerprint dataset to the electronic device 3, and transmit the signal to the handwriting input device 4.

In step 906, in response to receipt of the signal, the other one of the handwriting input device 4 and the stylus pen 5 transmits the other one of the signature pattern 40 and the fingerprint dataset to the electronic device 3. In this embodiment, the stylus pen 5 transmits the fingerprint dataset to the electronic device 3, but in other embodiments, the handwriting input device 4 may transmit the signature pattern 40 to the electronic device 3.

Then, in step 907, in response to receipt of the signature pattern 40 and the fingerprint dataset, the electronic device 3 generates a signed electronic document 600' by presenting the signature pattern 40 on a part of the electronic document 600 and embedding the fingerprint dataset in the signature pattern 40. On the other hand, in the case where the experienced pressure dataset does not correspond with the applied pressure dataset, the flow proceeds to step 908, in which the one of the handwriting input device 4 and the stylus pen 5 generates an alert message indicating that the experienced pressure dataset does not correspond with the applied pressure dataset, and transmits the alert message to the electronic device 3. It is noted that in this case, the signature pattern 40 and the fingerprint dataset are not transmitted to the electronic device 3.

It is noted that the method 900 also has effects and advantages similar to those of the methods 700, 800 as described in previous embodiments.

To sum up, embodiments of the disclosure provide a method for generating an electronic signature for an electronic document. In the method, when it is intended to generate an electronic signature on an electronic document displayed on the electronic device 3, a user is to hold the stylus pen 5 to sign on the handwriting input device 4. The electronic device 3 is configured to obtain the associated data from the handwriting input device 4 and the stylus pen 5, so as to compare the experienced pressure dataset and the applied pressure dataset. When it is determined that the experienced pressure dataset corresponds with the applied pressure dataset, it may be determined that the signature is indeed inputted by the user holding the stylus pen 5 through the handwriting input device 4. As such, the electronic device 3 proceeds to generate the signed electronic document, and the fingerprint dataset embedded in the signed electronic document can be used for subsequent verification. This enhances the authenticity of the signed electronic document.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A method for generating an electronic signature for an electronic document, the method being implemented by an electronic device that is in communication with a stylus pen and a handwriting input device that includes a writing area, the method comprising:
   initiating a signature input procedure associated with the electronic document;
   obtaining a signature pattern and an experienced pressure dataset recorded by the handwriting input device during the signature input procedure, and obtaining a fingerprint dataset and an applied pressure dataset recorded by the stylus pen during the signature input procedure;
   determining whether the experienced pressure dataset corresponds with the applied pressure dataset; and
   in the case where the experienced pressure dataset corresponds with the applied pressure dataset, generating a signed electronic document by presenting the signature pattern on a part of the electronic document and embedding the fingerprint dataset in the signature pattern.

2. The method as claimed in claim 1, wherein:
   the experienced pressure dataset includes a sequence of successive contact points on the writing area and a sequence of experienced pressures that are sensed by the handwriting input device and that are associated with the contact points, respectively, and the applied pressure dataset includes a sequence of applied pressures that are sensed at a tip of the stylus pen;
   the determining whether the experienced pressure dataset corresponds with the applied pressure dataset includes comparing a characteristic of the experienced pressures that is obtained based on the experienced pressure dataset with a characteristic of the applied pressures that is obtained based on the applied pressure dataset, and
   to determining that the experienced pressure dataset corresponds with the applied pressure dataset in the case where the characteristic of the experienced pressures corresponds with the characteristic of the applied pressures.

3. The method as claimed in claim 2, wherein:
   the experienced pressure dataset further includes a starting time instance and an ending time instance, and the applied pressure dataset further includes a starting time instance and an ending time instance;
   the determining whether the experienced pressure dataset corresponds with the applied pressure dataset includes
   comparing the starting time instances of the experienced pressure dataset and the applied pressure dataset, and comparing the ending time instances of the experienced pressure dataset and the applied pressure dataset, and
   determining that the experienced pressure dataset corresponds with the applied pressure dataset in the case where the starting time instance of the experienced pressure dataset is identical to the starting time instance of the applied pressure dataset, and that the ending time instance of the experienced pressure dataset is identical to the ending time instance of the applied pressure dataset.

4. A method for generating an electronic signature for an electronic document, the method being implemented by an electronic device, a handwriting input device that includes a writing area, and a stylus pen, the method comprising:
   initiating, by the electronic device, a signature input procedure associated with the electronic document;
   obtaining, by the handwriting input device, a signature pattern and an experienced pressure dataset during the signature input procedure;
   obtaining, by the stylus pen, a fingerprint dataset and an applied pressure dataset during the signature input procedure;
   collecting, by one of the handwriting input device and the stylus pen, the signature pattern and the experienced pressure dataset or the fingerprint dataset and the applied pressure dataset from the other one of the handwriting input device and the stylus pen;
   determining, by the one of the handwriting input device and the stylus pen, whether the experienced pressure dataset corresponds with the applied pressure dataset;
   in the case where the experienced pressure dataset corresponds with the applied pressure dataset, transmitting, by the one of the handwriting input device and the stylus pen, the signature pattern and the fingerprint dataset to the electronic device; and
   generating, by the electronic device, a signed electronic document by presenting the signature pattern on a part of the electronic document and embedding the fingerprint dataset in the signature pattern.

5. The method as claimed in claim 4, wherein:
   the experienced pressure dataset includes a sequence of successive contact points on the writing area and a sequence of experienced pressures that are sensed by the handwriting input device and that are associated with the contact points, respectively, and the applied pressure dataset includes a sequence of applied pressures that are sensed by the stylus pen;
   the determining whether the experienced pressure dataset corresponds with the applied pressure dataset includes comparing a characteristic of the experienced pressures that is obtained based on the experienced pressure dataset with a characteristic of the applied pressures that is obtained based on the applied pressure dataset, and
   determining that the experienced pressure dataset corresponds with the applied pressure dataset in the case where the characteristic of the experienced pressures corresponds with the characteristic of the applied pressures.

6. The method as claimed in claim 5, wherein:
   the experienced pressure dataset further includes a starting time instance and an ending time instance, and the applied pressure dataset further includes a starting time instance and an ending time instance;
   the determining whether the experienced pressure dataset corresponds with the applied pressure dataset includes
   comparing the starting time instances of the experienced pressure dataset and the applied pressure dataset, and comparing the ending time instances of the experienced pressure dataset and the applied pressure dataset, and
   determining that the experienced pressure dataset corresponds with the applied pressure dataset in the case where the starting time instance of the experienced pressure dataset is identical to the starting time instance of the applied pressure dataset, and that the ending time instance of the experienced pressure dataset is identical to the ending time instance of the applied pressure dataset.

7. A method for generating an electronic signature for an electronic document, the method being implemented by an electronic device, a handwriting input device that includes a writing area, and a stylus pen, the method comprising:

initiating, by the electronic device, a signature input procedure associated with the electronic document;

obtaining, by the handwriting input device, a signature pattern and an experienced pressure dataset during the signature input procedure;

obtaining, by the stylus pen, a fingerprint dataset and an applied pressure dataset during the signature input procedure;

collecting, by one of the handwriting input device and the stylus pen, the experienced pressure dataset or the applied pressure dataset from the other one of the handwriting input device and the stylus pen;

determining, by the one of the handwriting input device and the stylus pen, whether the experienced pressure dataset corresponds with the applied pressure dataset;

in the case where the experienced pressure dataset corresponds with the applied pressure dataset, transmitting, by the one of the handwriting input device and the stylus pen, a corresponding one of the signature pattern and the fingerprint dataset to the electronic device, and transmitting a signal to the other one of the handwriting input device and the stylus pen;

in response to the receipt of the signal, transmitting, by the other one of the handwriting input device and the stylus pen, the other one of the signature pattern and the fingerprint dataset to the electronic device; and generating, by the electronic device, a signed electronic document by presenting the signature pattern on a part of the electronic document and embedding the fingerprint dataset in the signature pattern.

8. The method as claimed in claim 7, wherein:

the experienced pressure dataset includes a sequence of successive contact points on the writing area and a sequence of experienced pressures that are sensed by the handwriting input device and that are associated with the contact points, respectively, and the applied pressure dataset includes a sequence of applied pressures that are sensed by the stylus pen;

the determining whether the experienced pressure dataset corresponds with the applied pressure dataset includes comparing a characteristic of the experienced pressures that is obtained based on the experienced pressure dataset corresponds with a characteristic of the applied pressures that is obtained based on the applied pressure dataset, and determining that the experienced pressure dataset corresponds with the applied pressure dataset in the case where the characteristic of the experienced pressures corresponds with the characteristic of the applied pressures.

9. The method as claimed in claim 8, wherein:

the experienced pressure dataset further includes a starting time instance and an ending time instance, and the applied pressure dataset further includes a starting time instance and an ending time instance;

the determining whether the experienced pressure dataset corresponds with the applied pressure dataset includes comparing the starting time instances of the experienced pressure dataset and the applied pressure dataset, and comparing the ending time instances of the experienced pressure dataset and the applied pressure dataset, and determining that the experienced pressure dataset corresponds with the applied pressure dataset in the case where the starting time instance of the experienced pressure dataset is identical to the starting time instance of the applied pressure dataset, and that the ending time instance of the experienced pressure dataset is identical to the ending time instance of the applied pressure dataset.

* * * * *